(12) United States Patent
Sinander

(10) Patent No.: US 6,385,770 B1
(45) Date of Patent: May 7, 2002

(54) SOFTWARE UPGRADE

(75) Inventor: Niklas Sinander, Oberursel (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/628,346

(22) Filed: Jul. 28, 2000

Related U.S. Application Data

(63) Continuation of application No. PCT/EP99/00603, filed on Jan. 29, 1999.

(51) Int. Cl.[7] ............................................. G06F 9/445
(52) U.S. Cl. ...................... 717/170; 717/169; 707/203; 709/221
(58) Field of Search ........................... 717/11, 168–170; 707/203, 10, 104.1; 709/221

(56) References Cited

U.S. PATENT DOCUMENTS

| | | | |
|---|---|---|---|
| 5,442,783 A | * 8/1995 | Oswald et al. ............... | 707/101 |
| 5,495,610 A | * 2/1996 | Shing et al. ................. | 709/221 |
| 5,852,735 A | 12/1998 | Urban | |
| 5,859,977 A | * 1/1999 | Nishiyama et al. .... | 395/200.53 |
| 5,878,408 A | * 3/1999 | Huben et al. ................... | 707/1 |
| 5,974,258 A | * 10/1999 | Ferri et al. ................... | 395/712 |
| 5,999,740 A | * 12/1999 | Rowley ....................... | 395/712 |
| 6,233,321 B1 | * 5/2001 | Guichard et al. ......... | 379/93.01 |

FOREIGN PATENT DOCUMENTS

| | | |
|---|---|---|
| DE | 196 17 976 A1 | 11/1997 |
| EP | 0 698 847 A | 2/1996 |
| EP | 0 807 883 A2 | 11/1997 |
| EP | 0 848 341 A2 | 6/1998 |
| WO | 94/01819 | 1/1994 |
| WO | 99/08206 * | 2/1999 |
| WO | 99/39266 * | 8/1999 |

OTHER PUBLICATIONS

Paul A. Bicknell, "Software Development and Configuration Management in the Cronus Distributed Operating System," IEEE 1988, pp. 143–147.*

"Installation Event Machine", IBM Technical Disclosure Bulletin, vol. 38, No. 4, Apr. 1, 1995, pp. 519–520.

* cited by examiner

*Primary Examiner*—Tuan Q. Dam
(74) *Attorney, Agent, or Firm*—Nixon & Vanderhye, P.C.

(57) ABSTRACT

Method and apparatus for efficient upgrading of a software system by a plurality of versions. The invention allows upgrades from an arbitrary software system version to another arbitrary subsequently released software system version at reduced cost and down time by executing an upgrade framework including all upgrade tasks identical for individual upgrade steps between two subsequent software system versions and a plurality of upgrade contents including tasks specific for each upgrade step. The invention allows to upgrade a software system in a real-time environment using a source system operating with an old software version and a target system for operating with the new software version and allows to handle static as well as dynamic data.

13 Claims, 5 Drawing Sheets

SOFTWARE UPGRADE

This is a continuation of PCT application PCT/EP99/00603, filed Jan. 29, 1999, the entire content of which is hereby incorporated by reference in this application.

The present invention relates to a method and system for upgrading a software system operated on data processing means, and in particular, the present invention relates to a method and system for upgrading a software system by a plurality of software system versions.

Software and computer controlled applications often exhibit a high level of complexity. Nevertheless, the pace of development of new systems and software versions or releases requires a constant adaptation of a software controlled system to the newest standards. The adaptation of a system to a new software standard is carried out in a so called upgrade, which in a complex system may be considerably time consuming. In general, an upgrade consists of changing or updating parts of the software system by replacing program files or configuration files with newer ones and/or to run update programs to fully implement the changes. Especially, if an software system or operating system is updated from an older version to a more recent or newly released version, generally a short downtime of parts of the data processing means or the entire system is introduced. During a downtime, processing or access to files is halted.

An operator of a software controlled computer system may choose to upgrade the system each time a new software version becomes available or, especially in cases where an upgrade is expensive or time consuming, he may choose to upgrade the software system less frequently than new releases or upgrades of the software system are developed.

In the latter case an upgrade of the software system to a desired version may consist of a plurality of individual upgrade operations carried out in a sequence. However, if a plurality of individual upgrades is carried out in a sequence, since each upgrade introduces a short downtime, the total downtime for the upgrade process to the desired software system version may become long by adding downtimes for each single upgrade step. Since downtimes render the system inoperable for that period of time, even if short, they are undesired. For example, in real time applications as in a telecommunications network, subscribers cannot be served during a downtime, and thus the number or duration of downtimes should be kept at a minimum.

Further, upgrading a system by a plurality of sequentially released software system versions also involves repeating similar or identical activities for each upgrade step, adding to the time spent by an operator, thus increasing costs.

One generally known method to reduce the total downtime during an upgrade process is to develop a specifically tailored upgrade for upgrading the software system from a current software version to a desired software version, instead of updating the system sequentially with individual upgrades. So called direct upgrades allow to upgrade the system directly in one step, instead of a series of steps, and allow to reduce the number of downtimes to a single downtime. However, direct upgrades need to be developed separately in addition to regular upgrades. The development of direct upgrades involves the redesign of already existing upgrades and merging them to achieve a tailored one-step upgrade, which is inefficient. Moreover, a large number of direct upgrades needs to be developed, one for each possible upgrade path, i.e., from an arbitrary software system version to any other arbitrary software system version. For these reasons step by step upgrades and direct upgrades are inconvenient and expensive and alternative methods are desired.

It is therefore object of the invention to provide a method and system for flexibly upgrading a software system at reduced costs.

This object of the invention is solved by the features of claims 1 and 10.

The inventive method allows to combine upgrade tasks identical for individual upgrades to an upgrade framework and allows to execute a plurality of upgrade contents in a sequence, each corresponding to a single upgrade from a particular software system version to another, thus being able to upgrade the system from an arbitrary current version to any desired newer software system version in one upgrade operation. The inventive method thus allows to combine regular upgrades for a software system to a one-step upgrade operation without the need of any double development.

The apparatus according to the invention allows upgrading a software system operating with a plurality of upgrade contents, each of the upgrade contents for upgrading the software system from one software system version to a subsequently released software system version.

The system may be operating in a real time environment.

Advantageously, the upgrade can be carried out with a single downtime by employing a source system, a target system and switching means for switching communication links to external devices between the source system and the target system.

The inventive method advantageously allows to upgrade a software system on data processing means operating in a real-time environment. The source system operating based on a software system version before the upgrade process and the target system arranged for operating using the upgraded software system are provided and allow that the software system is upgraded to the desired software system version on the target system while the source system is still operable with the software system version before the upgrade process. Advantageously, this allows to switch communication links from the source system to the target system in one step after the upgrade contents are executed. Thus, a software system can be upgraded with a single downtime.

Further, the inventive method advantageously allows to upgrade static data, the static data being data base contents or any other data before the upgrade process and/or upgrading dynamic data corresponding to events occurring during the upgrade process. This provides advantages especially in a real-time environment.

Each upgrade content may at least comprise static tasks for upgrading static data. An upgrade content may also comprise dynamic tasks for upgrading dynamic data. The static tasks of each upgrade content are sequentially applied to the static data and the dynamic data are sequentially processed by dynamic tasks of each upgrade content and the updated dynamic data are introduced into the static data after the upgrade of the static data has been completed. This assures that events occurring during the upgrade are appropriately adapted to the new software system version and may be applied to the static data, e.g. data base contents.

The upgrade framework may also comprise tasks for forwarding dynamic data between dynamic tasks of sequential upgrade contents. This allows that the in a real-time environment continuously occurring events are supplied to a subsequent upgrade content after being processed by a previous upgrade content.

The upgrade framework may at least comprise dumping data bases or contents of data storage means from the source system to the target system and initializing the logging of dynamic data in an event log. Thus the number of tasks of the upgrade contents can be reduced to a minimum.

The upgrade process may be halted after the execution of each individual upgrade content allowing greater flexibility, e.g. if intermediate testing of the system during the upgrade is desired.

Other advantages of the invention become apparent with further dependent claims.

The invention may be more fully understood, if read together with the accompanying drawings, wherein.

In the following, preferred embodiments of the invention are described with respect to the figures.

Figure 1:
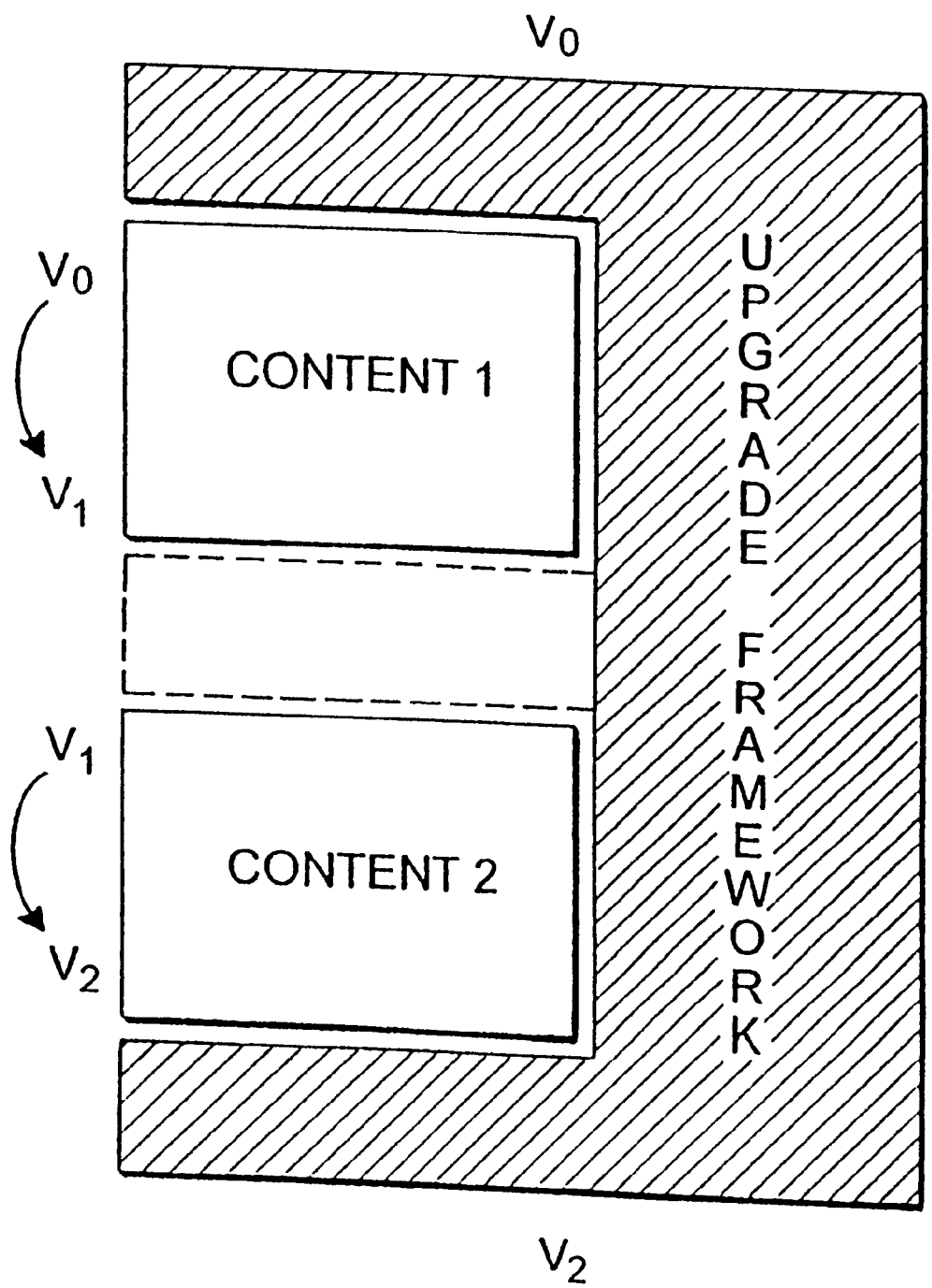
FIG. 1 shows a schematic drawing exemplifying the method according to the invention.

FIG. 1 shows an illustrating drawing, exemplifying the inventive method.

In example of FIG. 1, a software system is upgraded with two upgrades. The software system operates on data processing means. The software system may, e.g. be an application, a data or database manager or an operating system.

Each upgrade step allows upgrading the software system from a first software system version to a subsequently released second software system version, which preferably is the software system version released following the first software system version, however, it may be any other subsequently released software system version.

According to the invention, the upgrade operation is partitioned into an upgrade framework, the upgrade framework comprising tasks identical for each of the plurality of software system upgrades, and into upgrade contents, each of the upgrade contents comprising tasks specific for the corresponding software system upgrade.

In the present example two upgrade contents are provided.

In FIG. 1, the hatched part represents the upgrade framework for upgrade content 1 and upgrade content 2, which represent specific activities of the two software upgrades of the shown example. In general, an arbitrary number of upgrade contents may be provided, even though in the current example only two are shown.

A first part of the upgrade framework consists of upgrade tasks to be executed at an initial stage of the upgrade operation, before executing the upgrade contents. A second part of the upgrade framework consists of upgrade tasks to be executed in a final stage of the upgrade operation.

Between the two boxes illustrating upgrade contents 1 and 2 an optional part of-the upgrade framework is shown, which may be provided for carrying out a data transfer or communication between respective upgrade contents. This part of the upgrade framework represents, e.g., general communication tasks. It is drawn using a broken line for illustrating that it is optionally provided.

In the following, steps for performing the upgrade operation according to the embodiment of FIG. 1 are described.

As outlined, for any arbitrary upgrade step a number of identical tasks needs to be performed and, in case an upgrade over several versions of the software system is desired, according to the invention, these identical tasks are carried out in the upgrade framework, whereas the tasks for carrying out the actual upgrade steps are carried out in sequence without repeating the above-mentioned identical tasks.

In the present example, therefore initially a number of upgrade framework tasks will be carried out, generally speaking, to set up the data processing means for the actual upgrade. In the following, upgrade content 1 will be carried out, upgrading the system from software system version V0 to V1. Thereafter, upgrade content 2 is executed, upgrading the software system from version V1 to version V2. After this upgrade step is completed, again tasks of the upgrade framework are carried out, these tasks again being identical for each upgrade step. It is noted, that system version V0 stands for an arbitrary initial software system version.

In the example, it be assumed that the data processing means initially, i.e., before the upgrade operation, is operating with a software system version V0. It is further assumed that the software system version V1 and a software system version V2 as well as corresponding upgrades have already been released. The upgrades corresponding to system release V1 then serves for upgrading the system from software system version V0 to software system version V1 and the upgrade corresponding to system release V2 for upgrading the system from software system version V1 to software system version V2.

Further, an upgrade be desired from software system version V0 to software system version V2.

According to the invention, in the example of FIG. 1, initially the first part of the upgrade framework is executed. This can include the installation of temporary software for the upgrade operation, attachment and configuration of additional hardware or servers. This first part of the upgrade framework may also include the replication of databases or any data or data files in memories of the data processing means. The data or databases may, e.g., include data relating to applications, system components or may include subscriber data of, e.g. a telephone network operated by the system.

Following, upgrade content 1 is executed, upgrading the software system from software system version V0 to software system version V1. An upgrade content generally includes tasks for changing or introducing data corresponding to systems functions or the like, which are newly provided or do have a changed performance in software system version V1. An upgrade content may also include tasks for changing data or the structure of databases and other data stored on the data processing means.

After the specific tasks of upgrade content 1 are completed, upgrade content 2 is executed. This again involves specific tasks, now specific for upgrade content 2. Data corresponding to systems functions or the like, which are newly provided or do have a changed performance in software system version V2, may be changed or introduced.

Tasks of the upgrade framework, which may be executed after upgrade content 1 and before upgrade content 2, may control data flow between upgrade content 1 and upgrade content 2 which may involve an intermediate storage or buffering of data or the like.

Following to upgrade content 2 tasks of a second part of the upgrade framework are executed. This generally involves the removal of temporary software, detachment of temporary hardware, etc. It also includes resuming operations, now in accordance with the new software system version, in the above case version V2.

With the above-outlined inventive method, any desired upgrade operation from any software system version to any other software system version can conveniently be composed and performed without repeating identical tasks for each one single upgrade step or developing direct upgrades from one specific software system version to another software system version, e.g., ordered by a customer.

Figure 2:
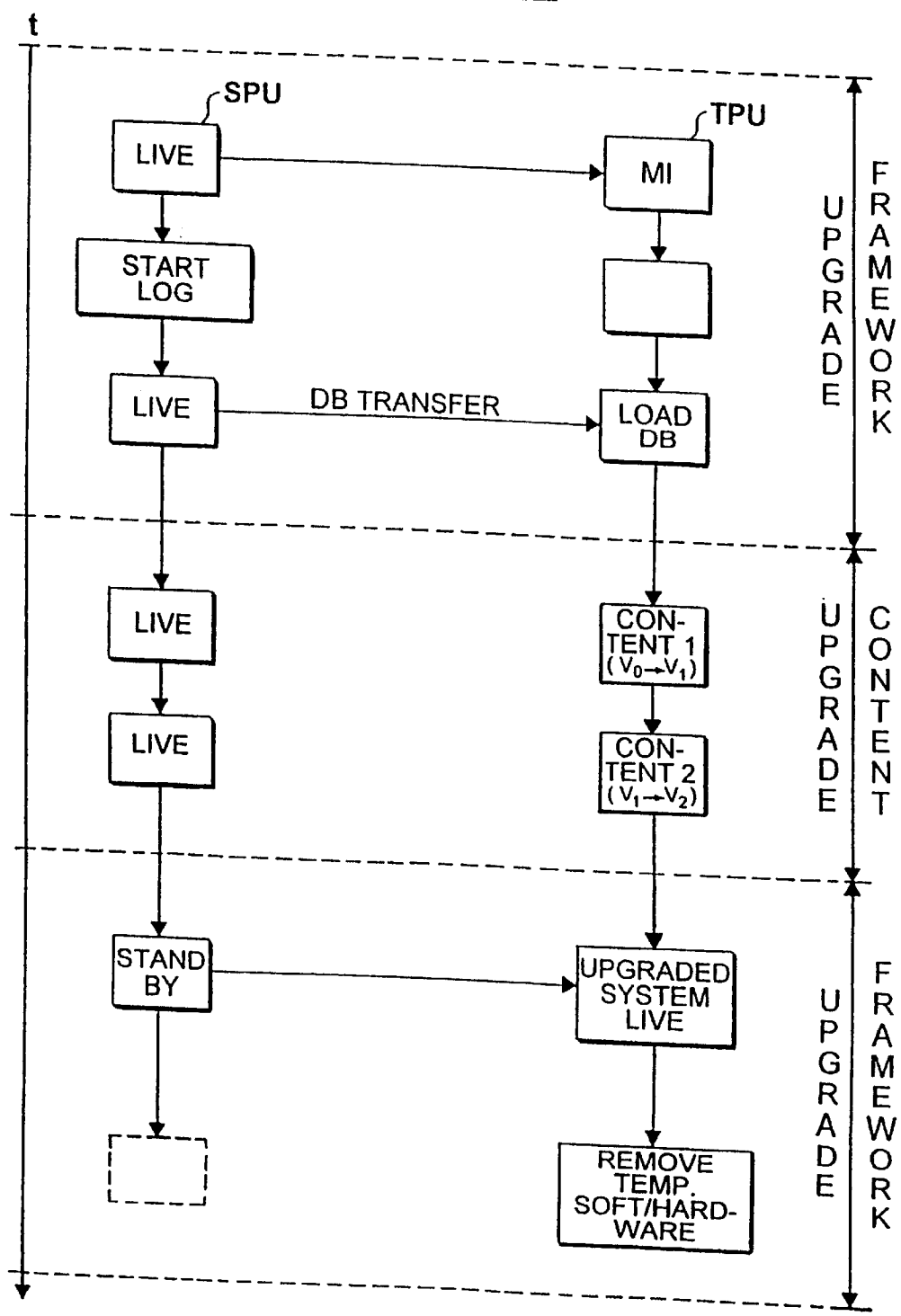
FIG. 2 shows a time/flow diagram illustrating the method according to one embodiment of the invention.

FIG. 2 shows a time/flow diagram illustrating another embodiment of the method according to the invention.

The example of FIG. 2 illustrates, how the inventive method may be applied to upgrading software systems on data processing means operating in a real-time environment. A real-time environment may be any environment, where operations need to be performed corresponding to events occurring. This may involve an immediate reaction of the system upon an event, e.g., a processing of data within milliseconds or seconds or may involve a reaction of the system in a certain time frame, which may be minutes or even days. Events may be, e.g., a transmission of data from sensors, a user, devices connected etc.

The real-time application of the embodiment of FIG. 2 may, e.g., the operation of a mobile telecommunications network. Thus, a real-time requirement may be, e.g. serving a line request, involving a short allowable time frame, or updating subscriber data, which may have a less strict time requirement.

As outlined in the introductory portion, an upgrade operation generally introduces a downtime of the system, which is undesirable especially in the case of real-time applications, since it renders the system inoperable for that period of time.

In real-time applications events it is likely that events occur during the upgrade, too. Events may be messages, actions or other types of information. In the present embodiment, an event may be a request for a line, a request for the allocation of time slots on a carrier to a particular channel, changing of subscriber information and the like. In order to avoid the loss of events occurring during the upgrade all such events are preferably recorded in an event log. This log is preferably upgraded and included into the system when the execution of the upgrade contents are finished.

The upgrade operation of the software of the the present example, e.g., a telecommunications network, may advantageously be carried out using two data processing devices, wherein one device is maintained operable as long as possible during the upgrade operation and the other takes over operations when the completion of the upgrade operation.

In the shown embodiment, two devices are provided for carrying out the upgrade operation, which are a source system SPU and a target system TPU. The source system is constituted by currently active data processing means operating with the software system, e.g., version V0 before the upgrade operation. The source system executes functions related to the real time environment. The software system could, as outlined before, be a data manager, an application or even an-operating system.

The target system TPU is constituted by data processing means, which may not be operable initially. The target system TPU is intended for operating with the upgraded software system, in the shown embodiment software system version V2. Since the target system does not yet operate in the real-time environment, the upgraded software system version may be installed on the target system while the source system SPU is kept operable. After the software system has been upgraded on the target system TPU from version V0 to version V2, or has been installed on the target system, operations are switched over from the source system SPU to the target system TPU which from that instant on assumes functions and services of the telecommunications network. Again, version V0 stands for any initial software system version.

Thus, the new features of the new software system version V2, for example a new subscriber service, may be added to the stand by telecommuniations network installed on the target system without interrupting operations of the source system.

If the software system is a data manager or similar, an appropriate operating system, e.g., the operating system of the source system, may already be installed on the target system. Further, hardware required for the new software system version may also be preinstalled in the target system. In general, the target system could be in any state initially.

The proceeding for upgrading the software system version according to the present embodiment will be now described in detail for a telecommunications system.

As indicated in FIG. 2, and outlined with respect to FIG. 1, according to the invention, the upgrade is partitioned into a first part of an upgrade framework, followed by upgrade contents and then again followed by a second part of the upgrade framework.

Again, the upgrade framework consists of tasks which are identical for all upgrade steps which are to be carried out. In the present case, the first task of the upgrade framework is the installation of the current version V0 of the software system. Thus, in a first step of the upgrade framework, in the present embodiment, the system configuration is transferred from the source system SPU to the target system TPU, e.g., in a maiden installation of the software system version V0. However, in other embodiments software system version V0 may already be installed on the target system TPU.

Thereafter, in further tasks of the upgrade framework, the installation of general software for the upgrade operation on the target system TPU may be performed, e.g., for preparing a changing of system functions or of subscriber services, as specified in the individual upgrade contents. If necessary, additional hardware may be attached and configured, for example hard disks. Also, temporary software, e.g. replication servers and the like may be installed.

In a next step of the upgrade framework data from memories of the source system or database contents or any further data are copied from the source system SPU to the target system TPU. The data or data bases may, e.g., contain subscriber data, network configuration data and the like.

The copied databases and other data on the target system TPU will therefore represent a status of the telecommunications network at the particular instant of time when they were dumped from the source system to the target system. Consequently, all further changes or events which occur at the source system after this instant in time need to be recorded, e.g., in an event log, in order to be able to take them into consideration during and at the end of the upgrade. Therefore, when the databases are copied to the target system, all events at the source system are recorded in an event log. This event log may reside on the source system or on the target system.

It is noted that the source system is still operable.

In FIG. 2, the logging process is started before databases are copied to the target system. However, in other embodiments, the log could be started at the same time or even after the databases are copied, e.g., depending on the software system. Of course, it needs to be assured, that none of the events to be recorded are lost.

After copying the system status of the source system SPU to the target system TPU, the target system is now prepared for the actual upgrade, i.e., the execution of the upgrade contents. In the following, while the source system SPU is still operable, individual upgrade contents are executed out on the target system TPU.

In the present example, at first an upgrade content for upgrading the software system from version V0 to V1 is executed. This may involve changing system functions as well as updating the database or other data, i.e., the static data dumped from the source system. Further, this involves upgrading the events recorded in the event log, so called dynamic data. Procedures for upgrading dynamic data and static data are generally known in the art. The upgrade content may involve the definition of which database tables or other data that have to be configured for a replication, starting function changes on the target system, using the source system data base, and it may include to apply data base changes that were logged on the source system during the database upgrade on the target system and as well as executing shell scripts, table definitions and the like needed for the upgrade of the software system from version V0 to V1. It may also include steps for defining which events need to be logged in the event log.

After upgrade content 1 has been completed, upgrade content 2, that is, the upgrade of the software system from version V1 to V2 is executed. Again, this involves upgrading the static data, the database and other data dumped from the source system, function changes as well as upgrading the events from the event log, which previously have been processed by upgrade content 1 and it may include further tasks, analogously to upgrade content 1.

At this point in time, the source system is still in an operating state.

After completing the tasks of the two upgrade contents, the second part of the upgrade framework is carried out. The software system on the target system has been upgraded to the desired software system version V2, however, the target system TPU is not yet operating in the real-time environment of the telecommunications network of the present embodiment. Operations are still carried out by the source system SPU, employing the software system version V0 before the upgrade operations.

Therefore, the second part of the upgrade framework comprises tasks to switch all communication links or lines from the source system to the target system, introducing the single short downtime during the entire upgrade operation. After switching the communication links, the target system TPU is now operable in the real-time environment, the source system SPU is not any longer operating. Further, tasks may be comprised in the second part of the upgrade framework to remove temporary software, hardware and any upgrade specific configurations from the target system TPU.

In other examples, the above described upgrade operation may also be carried out with a single system, in which case, e.g. the replication of static data takes place internally. However, in this case the system may not be operable during the entire upgrade, as in the above example, even though all events may be still logged in the event log, not all may be served in real-time during the upgrade.

In the following, with respect to the flow diagram of FIG. 3, another embodiment of the inventive upgrade method is described.

In the example of FIG. 3 again, the upgrade operation is partitioned into an upgrade framework and upgrade contents, as outlined before. An arbitrary number of upgrade contents may be executed, thus the software system may be upgraded by an arbitrary number of versions. Also, it is assumed, that the operating system of a telecommunications system is upgraded. Thus, the upgrade operation of the present example is performed in an real time environment and events as line requests and the like will occur at random. These events constitute the dynamic data stored in the event log, as outlined before. Besides said dynamic data, data not subjected to changes during the upgrade operation will be upgraded, e.g., of databases and other data, constituting the static data.

Figure 3:
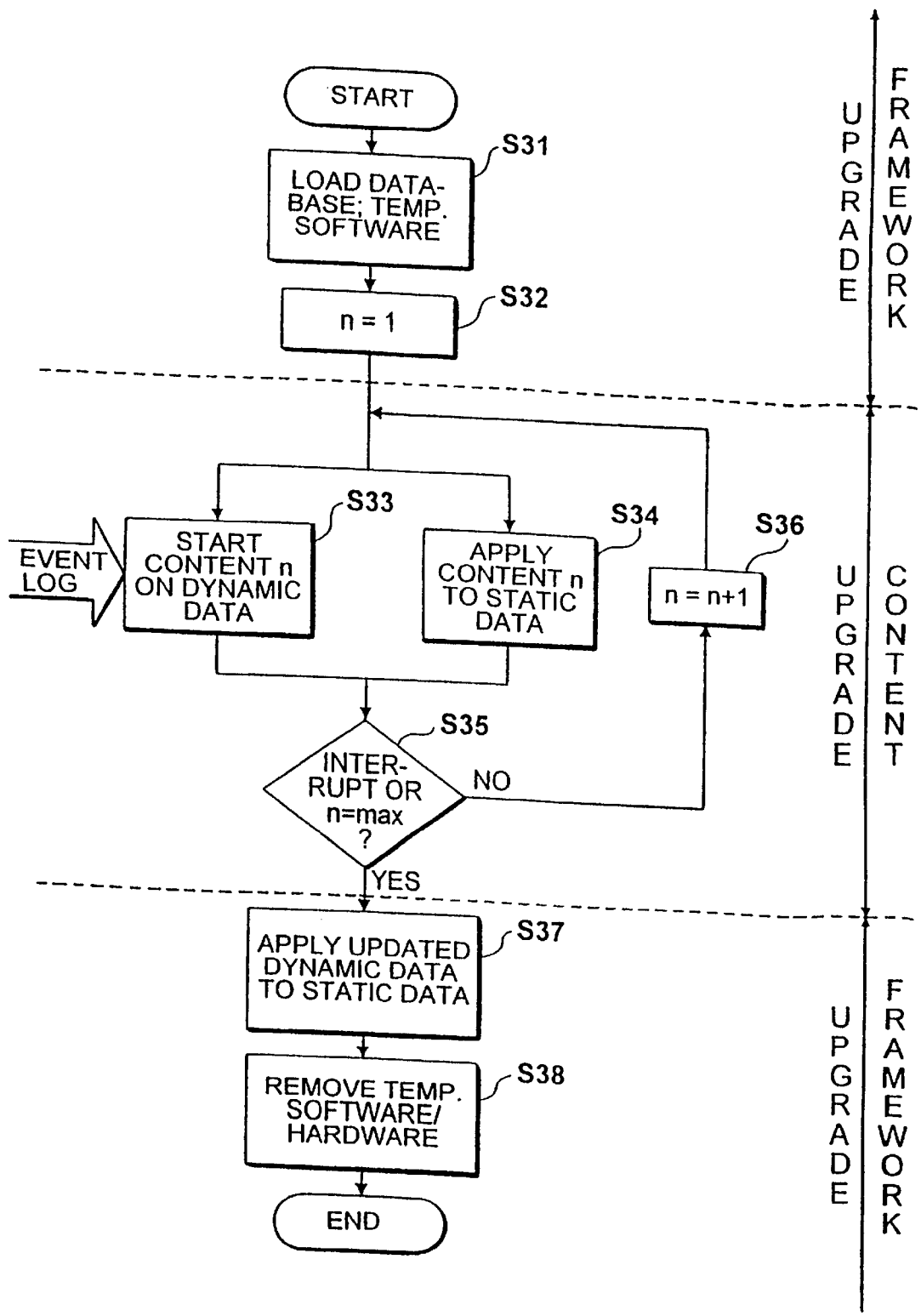
FIG. 3 illustrates an embodiment of the method according to the invention in a flow diagram.

In FIG. 3, in a step S31, after the initializing the upgrade operation, tasks of a first part of the upgrade framework are executed. This may include loading or replicating a database and the installation of temporary software, hardware and the like, as outlined previously. In a step S32 a counter is initialized with n=1. The counter enables selecting a specific upgrade content for execution. This completes the first part of the upgrade framework.

During the upgrade, all upgrade contents need to be applied to the static data as well as the dynamic data, as outlined with respect to FIG. 3. Thus, each upgrade content comprises static tasks for upgrading static data as well as dynamic tasks for upgrading dynamic data. Therefore, in a step S33 an upgrade content 1 for the dynamic data of the event log is executed. The upgrade content for dynamic data may, e.g., comprise tasks for adapting the format or the contents of the dynamic data to the new software system version and may include defining which data need to be logged. In a step S34, the upgrade content 1 for static data is applied to the databases and/or data to be upgraded. This may include defining database tables which have to be configured for replication and start of function change on the target system TPU using source system SPU databases or data;

As outlined before, steps S33 and S34 may also include function changes on the database, a processing of the event log according to upgrade tasks for dynamic data and the like. It is noted that the execution time of steps S33 and S34 is arbitrary, they may be carried out at the same time or in sequence.

In a step S35 it is interrogated, whether an interrupt is input by an operator or the last upgrade content has been executed. In case of the NO-alternative in a step S36 n is incremented by 1 and the flow returns to steps S33 and S34 where upgrade content 2 is applied to the dynamic data as well as to the static data. Following, it is again interrogated in step S36 whether an interrupt is input by the operator or the last upgrade content provided has been executed.

Analogously, the static tasks of all following upgrade contents are sequentially applied to the static data, and the dynamic data of the event log are sequentially processed by dynamic tasks of all upgrade contents. In case of the YES-alternative in step S35, the flow proceeds to a second part of the upgrade framework. In this case, either the last upgrade content has been executed or the upgrade content has been halted by an operator in order to perform system tests or the like.

In a step S37 the event log, sequentially processed by the dynamic tasks of each upgrade content is applied to the static data, e.g., a data base. This may be performed analogously to processing events in real time. Now the data base or other memory contents of the static data have been updated to the desired software system version by applying the upgraded recorded events of the event log. Thus, the static data represent the database or data according to the new software system version and according to all events occurred before and during the upgrade.

Now, as outlined in the previous embodiment with respect to FIG. 2, in the second part of the upgrade framework, communication links may be appropriately switched or established and in a step S38 temporary software, hardware and the like may be removed.

Figure 4:
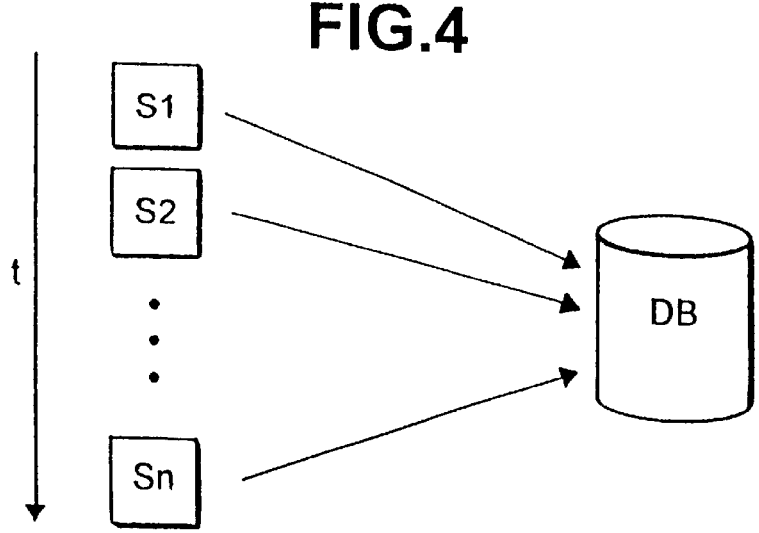
FIG. 4 illustrates the application of tasks for static data according to an embodiment of the invention.

FIG. 4 illustrates the application of static tasks of an arbitrary number of upgrade contents to static data according to an embodiment of the invention.

In FIG. 4, it is again assumed, that a system operating in a real-time environment is upgraded. A database DB was replicated at a certain instant of time, constituting static data. However, any type of data may constitute the static data.

The arrow on the left of FIG. 4 denoted t indicates time during the upgrade. Upgrade contents S1, S2 . . . Sn for upgrading static data are illustrated. Each of the upgrade contents for static data are applied in sequence to the static data, in this case the data base. As illustrated, each upgrade content is applied to the data base independently from the others. That is, the static data of the data base are upgraded using the static tasks of an upgrade content S1, and after upgrade content S1 has been completed, the static data of the data base are upgraded using the static tasks of an upgrade content S2. Analogously, an arbitrary number of upgrade contents, up to an upgrade content Sn are applied to the data base, after the previous has been completed, upgrading the database version by version. The upgrade contents are preferably applied in the sequence of their release, i.e., a software system version corresponding to upgrade content S1 was released before the software system version corresponding to upgrade content S2, etc. A later release relates to a more recent software system version.

Figure 5:
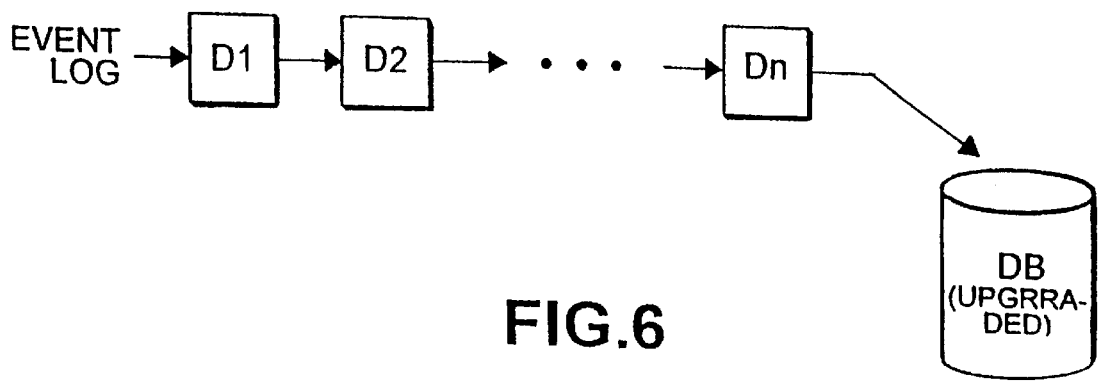
FIG. 5 illustrates the information flow regarding the event log and dynamic tasks of individual upgrade contents according to an embodiment of the invention.

FIG. 5 illustrates the information flow regarding the event log and dynamic tasks of individual upgrade contents according to another embodiment of the invention. Again it is assumed that the system is operating in a real-time environment.

In the previous example, it was shown that static data can be sequentially upgraded with static data of upgrade contents executed in a correct sequence in respective time windows. For dynamic data, i.e., the events recorded in an event log, the proceeding is different. Since it is assumed that the system is operating in a real-time environment, events will occur and be stored in the event log continuously, during the entire upgrade. This has the consequence that dynamic data of the entire event log, acquired during the upgrade, need to be processed sequentially by the dynamic tasks of the individual upgrade contents until the upgrade operation ends.

FIG. 5 shows that the event log is first processed by dynamic task D1 of a first upgrade content. The upgraded events are then processed by dynamic tasks D2 of a second upgrade content and following by an arbitrary number of upgrade contents for dynamic data up to a last upgrade content Dn. This processing of the event log is a continuous operation during the entire upgrade operation, since all events recorded at any time during the upgrade need to be processed by all upgrade contents for dynamic data D1–Dn. At the end of the upgrade operation, when no further new events are logged in the event log, the upgraded event log is applied to the static data, e.g., to the data base which has previously been upgraded by the static tasks of all individual upgrade contents for static data.

The upgrade framework may also provide tasks for interfacing dynamic data between individual upgrade contents, as it has been outlined with respect to the first embodiment of FIG. 1.

Figure 6:
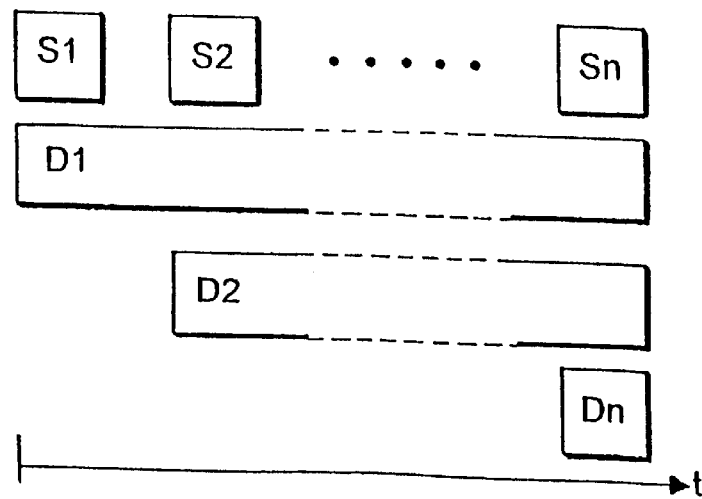
FIG. 6 illustrates a timing diagram of the active state of upgrade tasks according to one embodiment of the invention.

In FIG. 4 and FIG. 5 the execution of static tasks and dynamic tasks has been outlined. FIG. 6 illustrates a timing diagram according to another embodiment of the invention.

In FIG. 6 the actual times of operation of each individual upgrade task is illustrated. The arrow denoted t illustrates time during an upgrade. Boxes denoted S1, S2 and Sn indicate static tasks of a plurality of upgrade contents. The elongated boxes denoted D1, D2 and Dn illustrate corresponding dynamic tasks of the plurality of upgrade contents. It is assumed, that the numbering of the upgrade tasks reflects the time of release of corresponding software system versions, e.g., dynamic tasks D1 correspond to a software system version released before a software system version with associated dynamic tasks D2.

Since the data base is static or invariable during the upgrade, the static tasks of the upgrade contents may be applied in a time sequence, as it was outlined with respect to FIG. 4. As opposed to that, the entire event log recorded during the entire upgrade is to be processed by the dynamic tasks of all upgrade contents. Therefore, dynamic tasks, after being started corresponding to the execution of a particular upgrade content they continuously need process new events recorded in the event log until the upgrade has been completed. Thus, the dynamic tasks of a particular upgrade content remain active and continuously process events of the event log which were upgraded by dynamic tasks of a previous upgrade content.

After the recording of events is halted, which usually is when all upgrade contents have been executed, and before the upgraded software system goes into operation, the upgraded event log may be applied to the data base, which was previously upgraded by the static tasks of all upgrade contents.

Figure 7:
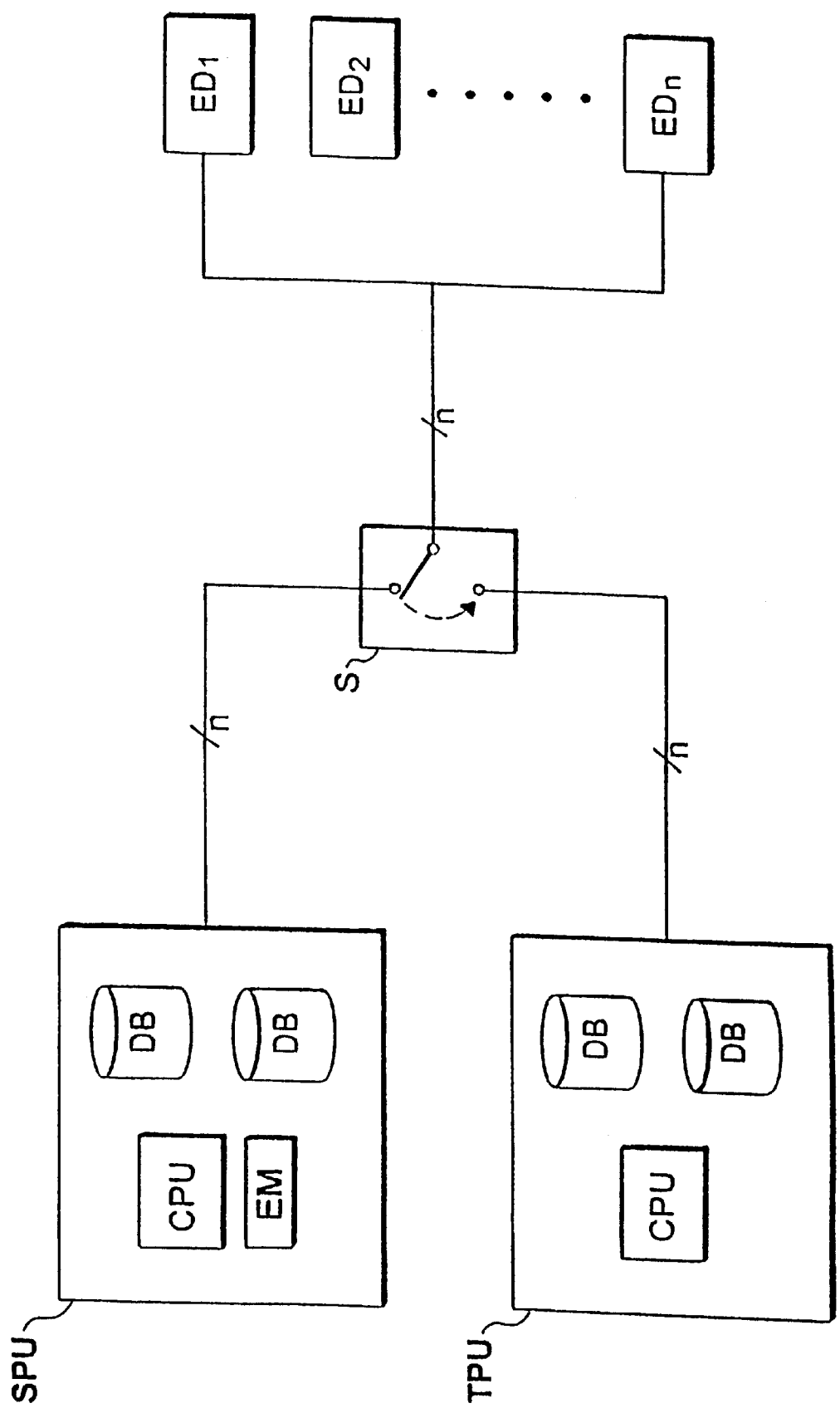
FIG. 7 shows an embodiment of a system according to the invention.

FIG. 7 shows an embodiment of a system according to the invention. It is assumed, that the system is part of a telecommunication network.

The system shown in FIG. 7 is arranged for upgrading a software system operating in a real time environment with a plurality of upgrade contents, each of the upgrade contents for-upgrading the software system from one software system version to a subsequently released software system version.

The system comprises: a source system SPU with a central processing unit CPU, database storage means DB, e.g., for storing subscriber data, status information concerning the network status, an event log EM for recording events occurring during the upgrade, e.g., subscriber data, call requests and the like, as it was outlined with respect to previous embodiments. The source system SPU further comprises communication lines to a plurality of external devices ED1–EDn, e.g. n communication lines. In case the source system is operating a mobile telephone network, the devices may be mobile telephones or nodes of the network. The source system processes events in real time, e.g., call requests and subscriber data in a telephone network. The source system SPU is operating based on a software system version before the upgrade.

The system further comprises a target system TPU, also equipped with a central processing unit CPU and database storage means DB. The database storage means of the target system TPU is arranged to receive a copy of the database contents of the source system SPU before the upgrade. Further, the target system is connected to the source system SPU, for receiving the database contents before the upgrade, event log contents during the upgrade.

During the upgrade, the target system TPU executes the plurality of upgrade contents, each of the upgrade contents comprising upgrade tasks specific for the corresponding software system upgrade, whereby the upgrade contents are executed in the order of the release of the corresponding software system versions. Since the upgrade deals with static and dynamic data, the target system TPU comprises upgrade means for upgrading static data, the static data being data base and memory contents before the upgrade as well as upgrading means for upgrading dynamic data corresponding to events recorded in the event log EM.

The system further comprises switching means connected to the source system SPU and the target system TPU and to the external devices. After the execution of the upgrade contents is completed, the switching means switches the communication lines between the source system SPU and the plurality of external devices to the target system TPU. Thus the target system TPU takes over operations from the source system SPU, operating with the upgraded software system.

What is claimed is:

1. Method of upgrading a software system on data processing means with a plurality of software system upgrade steps, each of the upgrade steps for upgrading the software system from one software system version to a subsequently released software system version, including:

executing a first part of an upgrade framework, the upgrade framework comprising tasks identical for each of the plurality of software system upgrades, for example including copying of static data from a source system (SPU) to a target system (TPU) and/or logging dynamic data in an event log;

executing a plurality of upgrade contents, each of the upgrade contents comprising tasks specific for the corresponding software system upgrade, whereby the upgrade contents are executed in the order of the release of the corresponding software system versions;

executing tasks of a second part of the upgrade framework, for example including the switching of communication links from the source system to the target system.

2. Method of upgrading a software system according to claim 1, characterized in that said data processing means operates in a real-time environment.

3. Method of upgrading a software system according to claim 1, characterized by upgrading static data, the static data being data base and/or memory contents before the upgrade; and/or upgrading dynamic data corresponding to events occurring during the upgrade operation, the dynamic data being recorded in an event log.

4. Method of upgrading a software system according to claim 3, characterized in that the data processing means at least includes a source system (SPU) operating based on an software system version before the upgrade operation and a target system (TPU) for operating with the upgraded software system;

the first part of the upgrade framework at least includes copying static data from the source system (SPU) to the target system (TPU) and/or start of logging dynamic data in the event log; and the second part of the upgrade framework at least comprises the task of switching communication links from the source system to the target system.

5. Method of upgrading a software system according to claim 3, characterized in that each upgrade content comprises static tasks for upgrading static data and/or dynamic tasks for upgrading dynamic data;

the static tasks of each upgrade content are sequentially applied to the static data;

the dynamic data of the event log are sequentially processed by dynamic tasks of each upgrade content; and the upgraded dynamic data are applied to the static data after the upgrade of the static data has been completed.

6. Method of upgrading a software system according to one of the claim 3, characterized in that the upgrade framework comprises tasks for forwarding dynamic data between dynamic tasks of sequential upgrade contents.

7. Method of upgrading a software system according to one of the claim 3, characterized in that each upgrade content comprises defining which events are to be logged in the event log.

8. Method of upgrading a software system according to one of the claim 3, characterized in that each upgrade content comprises defining database tables which have to be configured for replication; and start of function change on the target system (TPU) using source system (SPU) databases.

9. Method of upgrading a software system according to one of the claim 1, characterized in that the upgrade operation can be halted after each upgrade content.

10. Method of upgrading a software system-according to one of the claim 1, characterized in that said software system is an operating system and said data processing means at least performs functions in a telecommunications network.

11. Apparatus for upgrading a software system with a plurality of upgrade contents, each of the upgrade contents for upgrading the software system from one software system version to a subsequently released software system version, comprising:

a source system (SPU) with a central processing unit (CPU), database storage means (DB), an event log (EM) for recording events occurring during the upgrade operation, communication lines to a plurality of external devices (ED1–EDn), and the source system (SPU) operating based on a software system version before the upgrade operation;

a target system (TPU) with a central processing unit (CPU) and database storage means (DB) and connection lines to the source system (SPU), receiving database contents before the upgrade, event log contents during the upgrade and executing the plurality of upgrade contents, each of the upgrade contents comprising upgrade tasks specific for the corresponding software system upgrade, whereby the upgrade contents are executed in the order of the release of the corresponding software system versions; and switching means for switching the communication lines between the source system (SPU) and the plurality of external devices to the target system (TPU).

12. Apparatus for upgrading a software system according to claim 11, characterized in that it operates in a real-time environment.

13. Apparatus for upgrading a software system according to claim 11, characterized in that the target system (TPU) includes upgrade means for upgrading static data, the static data being data base and memory contents before the upgrade and/or upgrading means for upgrading dynamic data corresponding to events recorded in the event log (EM).

* * * * *

UNITED STATES PATENT AND TRADEMARK OFFICE
CERTIFICATE OF CORRECTION

PATENT NO.      : 6,385,770 B1
DATED           : May 7, 2002
INVENTOR(S)     : Sinander It is certified that error appears in the above-identified patent and that said Letters Patent is hereby corrected as shown below:

<u>Title page,</u>
Please insert the following:
-- [30]  Foreign Application Priority Data
Jan. 30, 1998   [DE]   Germany ........................ 198 03 697.3 --

Signed and Sealed this

Twenty-fifth Day of March, 2003

JAMES E. ROGAN
*Director of the United States Patent and Trademark Office*